United States Patent Office 3,432,345

Patented Mar. 11, 1969

1

3,432,345
PRODUCTION OF FRUCTOSE FROM DEXTROSE

George T. Tsao, Granite City, Thornton H. Reid, Alton, and Fred L. Hiller and Lawrence H. Hubbard, Granite City, Ill., assignors to Union Starch & Refining Co., Inc., Columbus, Ind., a corporation of Indiana No Drawing. Filed Apr. 7, 1966, Ser. No. 540,854

U.S. Cl. 127—42 6 Claims

Int. Cl. C13k *9/00;* C13d *3/00*

This invention relates to a process of transforming dextrose to fructose by an isomerization reaction.

Among the objects of the invention are to provide an improved method of transforming dextrose to fructose.

Among other objects of the invention is to provide a comparatively mild method of isomerizing dextrose to fructose.

This invention is based on the discovery that the treatment of dextrose solutions with cyclohexylamine effects the isomerization of a portion of the dextrose to fructose.

Besides the isomerization reaction, dextrose and cyclohexylamine can undergo another reaction to form a compound of which the molecular structure is not determined. This compound can be crystallized and dried. It has a very sharp melting point of 97.5 to 98.5° C. This compound is soluble in water and in a number of organic solvents such as acetone, ethanol, etc., and also mixtures of solvents. In the rest of this patent disclosure, we shall refer to this reaction as the "complexing reaction," and the product compound as the "dextrose-cyclohexylamine complex." The mechanism of the reaction is not yet known; the structure of the product compound is not yet determined. However, this complexing reaction is an important part of the treatment for the production of solutions containing both fructose and dextrose which is one of the objects of our invention.

The isomerization reaction and the complexing reaction are the two most important chemical reactions pertinent to this disclosure. There may be side reactions including one or more reactions which effect the coloration of the sugar solution during the treatment of dextrose with cyclohexylamine.

Although no connection between the isomerizing reaction and the complexing reaction has been established, it is quite possible that the dextrose-cyclohexylamine complex is an intermediate product of a plural reaction which results in the isomerization of dextrose.

Fructose is generally known to be sweeter than dextrose. A dextrose solution, after this isomerization reaction, followed with purification treatments becomes a solution of both dextrose and fructose. The sweetness is thus increased. The measurement of sweetness is still a controversial subject in the scientific field, so that the increase in sweetness of the solution of the invention can be set forth only in terms of the increase in fructose content.

In the syrup making business, it is generally known that there is an upper limit on the dextrose content of the final syrup product if the product is to retain the characteristics of a liquid. If the final product contains, say, about 80% dissolved solids (D.S.), the dextrose content of the syrup should not be more than 40 to 44% (based upon the total dissolved solids). Syrups of about 80% D.S. and 40 to 44% or more dextrose always have the tendency of becoming solidified due to crystallization. This tendency of crystallization can be avoided if a part of the dextrose is transformed into fructose. Thus another object of the invention is to provide a syrup of high saccharose content and reduced tendency to crystallize.

Fructose, itself, of course, has many uses. For instance; by hydrogenation, mannitol and sorbitol can be derived from fructose. Other uses are described in many standard books and literature references.

2

The objects of the invention are attained by adding a predetermined amount of cyclohexylamine to a dextrose-containing solution and incubating the reaction for a suitable time at a temperature which is correlated with the time of incubation.

After the reaction has progressed to the desired degree the reaction can be halted by neutralizing the cyclohexylamine or by cooling the solution and removing the cyclohexylamine. Or, instead of removing cyclohexylamine, the fructose/dextrose ratio can be increased by removing a portion of the dextrose with the aid of cyclohexylamine as described further below.

Substantially, any dextrose solution can be employed in the process. Thus, the dextrose-containing solution can be an aqueous solution obtained by dissolving anhydrous dextrose in water, or dextrose monohydrate in water. The solution can also be the so-called dextrose syrup or the so-called 98 to 100% dextrose equivalent (D.E.) syrup made by the enzymatic hydrolysis of starch, the technique of which is well known in the industry. Other types of syrups or diluted syrups containing dextrose can be employed.

The dextrose solution used in the isomerization reaction is first adjusted to a proper concentration. The concentration can be as low as 5 g. of dextrose per 100 ml. solution. Dextrose solutions of greater dilutions can be employed except that it may not be economical and unnecessary from practical point of view to employ very dilute solutions. The concentration of dextrose in the solution can also be as high as about 50 g. dextrose per 100 ml. of solution. Here again, even more concentrated dextrose solutions can be employed except that the mechanical difficulty in handling such solutions due to high viscosity is a drawback.

The amount of cyclohexylamine can be as low as 0.5 ml. of cyclohexylamine per 100 ml. of dextrose solution. Actually, the only limits on the amount of cyclohexylamine used are the economical ones.

The temperature for the cyclohexylamine treatment can be as low as about 15° C. At 15° C., the isomerization reaction is very slow. A temperature of 30 to 35° C. is considered the most desirable temperature. A temperature of 60° C. or higher may cause excessive coloration of the dextrose solution. The practical temperature range is therefore between about 20° C. and 60° C.

The length of time for the isomerization reaction can vary over a very wide range. When the reaction is carried out at a low temperature and a low level of cyclohexylamine, one to two weeks may be required to reach an appreciable level of fructose. For process convenience, the length of time should be controlled between 30 minutes to 72 hours. A 24 hour reaction time seems to be a very convenient one for plant operation. The time can therefore be adjusted to depend upon the actual factory conditions and upon the product that one wants to produce. The time of treatment is obviously correlated with the temperature and proportion of cyclohexylamine.

The treated product solution is usually colored due to side reactions. The solution can be purified to remove cyclohexylamine and by-products. The purifications can be carried out with the ordinary techniques such as distillation, ion exchange resin treatment, active carbon treatment, and/or evaporation.

The solution thus obtained can contain up to 30 to 33% fructose based on the total amount of dextrose and fructose present. Known isomerization reactions with sodium hydroxide or calcium hydroxide usually produce a maximum of 28–32% of fructose. In the cases where still higher percentage of fructose is desired, the sugar solution after the isomerization reaction will be further processed in a different manner. To a great extent, this latter part of the treatment depends on the concentration of the sugar solution and the amount of cyclohexylamine added initially. If these amounts are fairly high to start with, by simple cooling, crystals of the dextrose-cyclohexylamine complex will be precipitated out. The crystals can easily be separated by filtration or centrifugation. The mother liquor thus obtained will be then purified to remove cyclohexylamine and other impurities. The crystals have a melting point of 97.5 to 98.5° C. and are soluble in a number of solvents. The purified sugar solution containing up to 80% fructose based on the total amount of dextrose and fructose present in the solution are readily prepared in this manner.

The method, per se, of increasing the ratio of fructose to dextrose in solutions containing the same by the process of crystallizing the dextrose-cyclohexylamine complex and separating the crystalline complex from the solution is disclosed and claimed in our application Ser. No. 540,858 filed on even date herewith.

Crystallization by cooling is one method for removing the dextrose-cyclohexylamine complex from the treated solution. The dextrose-cyclohexylamine complex can also be separated from the solution by solvent extraction. The process, per se, of separating a dextrose-cyclohexylamine complex from solutions containing dextrose and fructose by extracting with an organic solvent adapted to form a separate phase, so as to increase the fructose to dextrose ratio in the treated solution is disclosed and claimed in our application Ser. No. 540,839 filed on even date herewith.

Since the degree to which the fructose content of the solutions treated according to the present invention is limited and since the raw solutions obtained by the present invention already contain cyclohexylamine, the process of this invention is especially adapted to be combined with either of the processes referred to in said copending applications.

With the dextrose removal processes disclosed above there may not be enough cyclohexylamine in the solution to form a substantial amount of the complex since the isomerization reaction can be carried out with relatively small amounts of the cyclohexylamine. It is, therefore, desirable to adjust the cyclohexylamine content of the solution to about 20 to 200 ml. per 100 ml. of solution in order to proceed with the separation step. In our study, and in the Examples set forth below, the analytical work was done by three alternative methods. They are, (1) by the paper chromatographic method, (2) by the gas chromatographic method, and (3) by optical rotation determination. The results of the three methods checked with one another within usual variance of analytical work.

The invention will be exemplified in the following specific examples with the understanding that these examples are preferential and illustrative and are not to be construed as limiting the invention to the data given.

Example 1

A dextrose solution made by dissolving 22 g. of dextrose monohydrate in 100 ml. of water was mixed with 0.2 ml. of cyclohexylamine. The mixture was kept at room temperature for 15 days. The solution was then analyzed and found to contain 7% fructose based upon the total amount of dextrose and fructose present.

Example 2

A dextrose solution made by dissolving 22 g. of dextrose monohydrate in 100 ml. of water was mixed with 10 ml. of cyclohexylamine. The mixture was maintained at 30° C. for 23 hours. The treated solution was analyzed and found to contain 33% fructose based upon the total amount of dextrose and fructose present.

Example 3

A solution made by dissolving 11 g. of dextrose monohydrate in 100 ml. of water was added with 1 ml. of cyclohexylamine. The solution after 24 hours of incubation at 34° C. was analyzed and found to contain 8.5% fructose based upon the total amount of dextrose and fructose present.

Example 4

A syrup of 92 D.E. (dextrose equivalent) made by the hydrolysis of both acid and hydrolytic enzyme was found to contain 80% dextrose on a dry solids basis. A sample of this syrup was diluted with water to 10 g. of dextrose per 100 ml. solution. To a 100 ml. portion of this solution, 25 ml. of cyclohexylamine was added. The mixture was then maintained at 30° C. for 24 hours. The treated solution was analyzed and found to contain 16% fructose.

Example 5

A solution was made by mixing and warming 50 g. of anhydrous dextrose, 24 ml. water, and 100 ml. of cyclohexylamine. After 30 minutes, the mixture was neutralized with hydrochloric acid. The solution was then purified and analyzed. It contains 15% fructose.

Example 6

A solution was made by diluting a 100 D.E. dextrose syrup made by enzymatic hydrolysis of corn starch to 10 g. of dissolved solids per 100 ml. solution. A 100 ml. portion of this solution was heated to 85° C. in a steam bath and then added with 5 ml. of cyclohexylamine. After 5 minutes of stirring at 85° to 90° C., the solution was quickly brought to acidic pH with a few milliliters of concentrated hydrochloric acid. The solution by now was strongly colored. After stripping the cyclohexylamine and purification with active carbon, etc., a light-colored solution was obtained and analyzed. It was found to contain 14.9% fructose based on the total amount of dextrose and fructose present in the final solution.

Example 7

A dextrose solution was made by dissolving 22 g. of dextrose monohydrate in 100 ml. of water. After adding 25 ml. of cyclohexylamine, the solution was then analyzed and found to contain 26.5% fructose based on the total amount of dextrose and fructose present.

Example 8

A solution containing 33% fructose made according to the procedure of Example 2 was adjusted by evaporation under vacuum to 50 g. of reducing sugar as dextrose per 100 ml. of the concentrated solution. To 1000 ml. of the concentrated solution, 1000 ml. of cyclohexylamine was added. The mixture was stirred for 2 hours in an ice bath. Crystals were precipitated at the end of the 2-hour period. The crystals are removed by filtration. The mother liquor was analyzed and found to contain 77.2% fructose based on the total amount of dextrose and fructose present. The crystals obtained were washed and purified. The dry crystals have a melting point of 97.5 to 98.5° C. They are "the dextrose-cyclohexylamine complex," described above. A portion of the crystals was dissolved in water. The solution was allowed to stand overnight. The solution was then evaporated under vacuum to remove a part of cyclohexylamine which can be recycled. The evaporated solution was incubated at 30° C. for 24 hours. The solution was then analyzed and found to contain 33% fructose based on the total dextrose and fructose. This solution containing 33% fructose can be concentrated by another crystallization treatment carried out in the same way.

Example 9

A solution containing 33% fructose made according to the procedure of Example 2 was concentrated by evaporation to a heavy liquor containing about 70 g. of dissolved solids per 100 g. of total liquor. A portion of 70 ml. of the heavy liquor was mixed with 120 ml. of cyclohexylamine. The total mixture was stirred for about 30 minutes. Then, 62.5 ml. xylene and 140 ml. water were added for extraction. A two-phase system was obtained. The separated aqueous phase obtained from the extraction was analyzed and found to contain 60.4% fructose based on the total amount of dextrose and fructose present.

The features and principles underlying the invention described above in connection with specific exemplifications will suggest to those skilled in the art many other modifications thereof. It is accordingly desired that the appended claims shall not be limited to any specific feature or details thereof.

We claim:
1. A process of isomerizing a portion of the dextrose in an aqueous solution containing dextrose and containing less than about 33% of fructose based on the total amount of dextrose and fructose comprising adding 0.5 ml. to about 300 ml. of cyclohexylamine per 100 ml. of dextrose solution and incubating the solution at a temperature of 15° C. to about 60° C. for a period of about ½ hour to several weeks, the longer times being employed with the lower temperatures and being correlated with the temperatures to produce a solution containing more than the original percent of fructose but no more than 33% of fructose.

2. The process as claimed in claim 1 comprising halting the reaction by neutralizing the solution and removing the cyclohexylamine from the solution.

3. The process as claimed in claim 1 comprising halting the reaction by cooling the solution and thereafter removing the cyclohexylamine therefrom.

4. The process as claimed in claim 1 comprising halting the reaction by cooling the solution and removing at least a part of the cyclohexylamine therefrom in the form of a dextrose-cyclohexylamine complex which has a melting point of about 97.5–98.5.

5. The process as claimed in claim 1 comprising adding additional cyclohexylamine to the incubated solution, cooling the solution to precipitate a dextrose-cyclohexylamine complex having a melting point of 97.5 to 98.5° C. and separating said complex from the solution to provide a solution having a higher ratio of fructose to dextrose.

6. The process as claimed in claim 1 comprising adjusting the cyclohexylamine content of the solution to a value of 20 to 200 ml. per 100 ml. of solution whereby to form a dextrose-cyclohexylamine complex, cooling the solution to precipitate the latter complex and removing said complex from the solution.

References Cited

UNITED STATES PATENTS

| | | | |
|---|---|---|---|
| 2,094,053 | 9/1937 | Anthony | 127—42 X |
| 2,504,169 | 4/1950 | Wolfram et al. | 127—42 X |
| 2,813,810 | 11/1957 | Smith et al. | 127—30 X |
| 3,150,006 | 9/1964 | Opila | 127—63 |
| 3,173,908 | 3/1965 | Mann et al. | 127—30 X |

OTHER REFERENCES

Ishikawa: "Decomposition . . . Cyclohexylamine," Chem. Abstracts 63:1852, 3 (1965).

Ishikawa: "Production . . . Cyclohexylamine," Chem. Abstracts 63:1853 (1965).

Carson: "The Reaction . . . Cyclohexylamine," J. Am. Chem. Soc. 77:1881–84 (1955).

Liquid Extraction: Treybal, N.Y., McGraw-Hill, 1951, pp. 1–4.

Industrial Solvents: Mellan, N.Y., Reinhold, 1950, pp. 407, 410, 430.

MORRIS O. WOLK, *Primary Examiner.*

D. G. COLIN, *Assistant Examiner.*

U.S. Cl. X.R.

127—30, 58